US010068612B2

United States Patent
Newell et al.

(10) Patent No.: US 10,068,612 B2
(45) Date of Patent: Sep. 4, 2018

(54) SYSTEMS AND METHODS FOR GENERATING AND PRESENTING VIRTUAL EXPERIENCES

(71) Applicant: EchoStar Technologies L.L.C., Englewood, CO (US)

(72) Inventors: Nicholas Brandon Newell, Centennial, CO (US); Swapnil Anil Tilaye, Superior, CO (US); Carlos Garcia Navarro, Boulder, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 15/093,912

(22) Filed: Apr. 8, 2016

(65) Prior Publication Data
US 2017/0294209 A1  Oct. 12, 2017

(51) Int. Cl.
| | |
|---|---|
| *H04N 7/18* | (2006.01) |
| *G11B 27/031* | (2006.01) |
| *H04N 21/81* | (2011.01) |
| *H04N 21/854* | (2011.01) |
| *A63F 13/10* | (2006.01) |
| *A63F 13/213* | (2014.01) |
| *A63F 13/00* | (2014.01) |

(52) U.S. Cl.
CPC ......... *G11B 27/031* (2013.01); *H04N 21/812* (2013.01); *H04N 21/816* (2013.01); *H04N 21/8106* (2013.01); *H04N 21/854* (2013.01)

(58) Field of Classification Search
USPC .......... 386/280, 278, 239, 248; 348/42, 154, 348/155
See application file for complete search history.

(56) References Cited

U.S. PATENT DOCUMENTS

| | | | |
|---|---|---|---|
| 6,050,962 | A | 4/2000 | Kramer et al. |
| 7,426,467 | B2 | 9/2008 | Nashida et al. |
| 7,460,125 | B2 | 12/2008 | Yang et al. |
| 7,516,469 | B1 | 4/2009 | Kikinis et al. |
| 7,948,481 | B2 | 5/2011 | Vilcovsky |
| 8,560,387 | B2 | 10/2013 | Amidon et al. |

(Continued)

OTHER PUBLICATIONS

"Dynamic 3D Avatar Creation from Hand-held Video Input", Ichim, et al., Aug. 2015.

(Continued)

*Primary Examiner* — Daquan Zhao
(74) *Attorney, Agent, or Firm* — Perkins Coie LLP

(57) ABSTRACT

Various embodiments facilitate the creation and presentation of a virtual experience. In one embodiment, the virtual experience is assembled from user model data corresponding to a three-dimensional representation of a user, user movement data corresponding to at least one movement characteristic of the user, user voice data corresponding to at least one vocal characteristic of the user, environment data corresponding to a three-dimensional representation of a location, and event data corresponding to a captured event at the location. The virtual experience is a virtual recreation of the captured event at the location, with the three-dimensional representation of the user, the vocal characteristic of the user, and the movement characteristic of the user inserted into the captured event.

18 Claims, 7 Drawing Sheets

(56) References Cited

U.S. PATENT DOCUMENTS

| | | |
|---|---|---|
| 8,869,197 B2 | 10/2014 | Chang et al. |
| 8,982,110 B2 | 3/2015 | Saban et al. |
| 8,984,568 B2 | 3/2015 | Mickelsen et al. |
| 9,159,151 B2 | 10/2015 | Perez et al. |
| 9,656,162 B2 * | 5/2017 | Polzin .................. A63F 13/213 |
| 9,623,738 B2 | 11/2017 | Newell et al. |
| 2005/0148388 A1 * | 7/2005 | Vayra ...................... A63F 13/10 |
| | | 463/32 |
| 2008/0163344 A1 | 7/2008 | Yang |
| 2009/0237492 A1 | 9/2009 | Kikinis et al. |
| 2010/0083308 A1 | 4/2010 | Chang et al. |
| 2012/0069131 A1 | 3/2012 | Abelow et al. |
| 2013/0257877 A1 | 10/2013 | Davis |
| 2013/0260850 A1 | 10/2013 | Carpe et al. |
| 2013/0346177 A1 | 12/2013 | Jung et al. |
| 2014/0171039 A1 | 6/2014 | Bjontegard |
| 2014/0189733 A1 | 7/2014 | Anguiano |
| 2014/0189743 A1 | 7/2014 | Kennedy et al. |
| 2015/0154453 A1 | 6/2015 | Wilf |
| 2015/0154691 A1 * | 6/2015 | Curry ................. G06Q 30/0643 |
| | | 705/27.2 |
| 2015/0262405 A1 | 9/2015 | Black et al. |

OTHER PUBLICATIONS

"Nikon Just Put Me in a Video Game and It Was Totally Insane", Chan, Jan. 8, 2014.

"The Virtual Human Interface: A Photorealistic Digital Human", Takacs et al., Oct. 2003.

* cited by examiner

Event Capture

3D Virtual Event

SYSTEMS AND METHODS FOR GENERATING AND PRESENTING VIRTUAL EXPERIENCES

TECHNICAL FIELD

This disclosure relates to virtual experiences and methods of creating and presenting the same.

BACKGROUND

A recording of an event typically captures visual information with a camera and audio information with a microphone. The visual information may be captured in two dimensions or in three dimensions. Similarly, the audio information may be captured in mono, stereo, or surround sound.

The recorded visual information and audio information may be used to present a recreation of the event. The recreation of the event is typically from the point-of-view of the camera, and the people, places, things, sounds, and movements that occurred during the event are fixed based on what was captured by the camera and microphone.

SUMMARY

The present disclosure relates to systems, methods, and apparatus for facilitating the creation and presentation of a virtual experience. According to one embodiment, a virtual experience system, includes a user model storage configured to store user model data corresponding to a three-dimensional representation of a user; a user movement storage configured to store user movement data corresponding to at least one movement characteristic of the user; a user voice storage configured to store user voice data corresponding to at least one vocal characteristic of the user; an environment storage configured to store environment data corresponding to a three-dimensional representation of a location; an event storage configured to store event data corresponding to a captured event at the location; a receiver coupled to the user model storage, the user movement storage, the user voice storage, the environment storage, and the event storage, the receiver configured to assemble a virtual experience based at least in part on the user model data, the user movement data, the user voice data, the environment data, and the event data; and a display device coupled to the receiver, the display device configured to display the virtual experience to a user, the user being able virtually recreate the captured event at the location, with the three-dimensional representation of the user, the vocal characteristic of the user, and the movement characteristic of the user inserted into the captured event.

In some embodiments, the receiver is configured to assemble the virtual experience such that the three-dimensional representation of the user, the vocal characteristic of the user, and the movement characteristic of the user replace a person who was physically present at the captured event. In some embodiments, the system further includes a user modeling device configured to capture the user model data, the user voice data, the user movement data, or a combination thereof. In some embodiments, the system further includes an event capture device configured to capture the event data, the environment data, or a combination thereof.

In some embodiments, the virtual experience includes virtual merchandise inserted into the virtual experience. In some embodiments, the user purchases the virtual merchandise. In some embodiments, the virtual merchandise replaces physical merchandise present at the captured event. In some embodiments, the captured event is associated with a real-life event captured at a physical location. In some embodiments, the virtual experience with the three-dimensional representation of the user, the vocal characteristic of the user, and the movement characteristic of the user inserted into the captured event is stored as a new event. In some embodiments, the receiver is further configured to assemble the virtual experience based at least in part on second user model data, second user movement data, and second user voice data, such that multiple users are inserted into the captured event.

It is to be understood that both the foregoing summary and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The same number represents the same element or same type of element in all drawings.

DETAILED DESCRIPTION OF THE DRAWINGS

The technology described herein is related to U.S. patent application Ser. No. 14/449,013, filed on Jul. 31, 2014, which is incorporated by reference herein in its entirety.

The various embodiments described herein generally provide apparatus, systems and methods which facilitate the creation and presentation of a virtual experience. The virtual experience is a virtual recreation of a captured event with a three-dimensional representation of a user inserted into the captured event.

Figure 1:
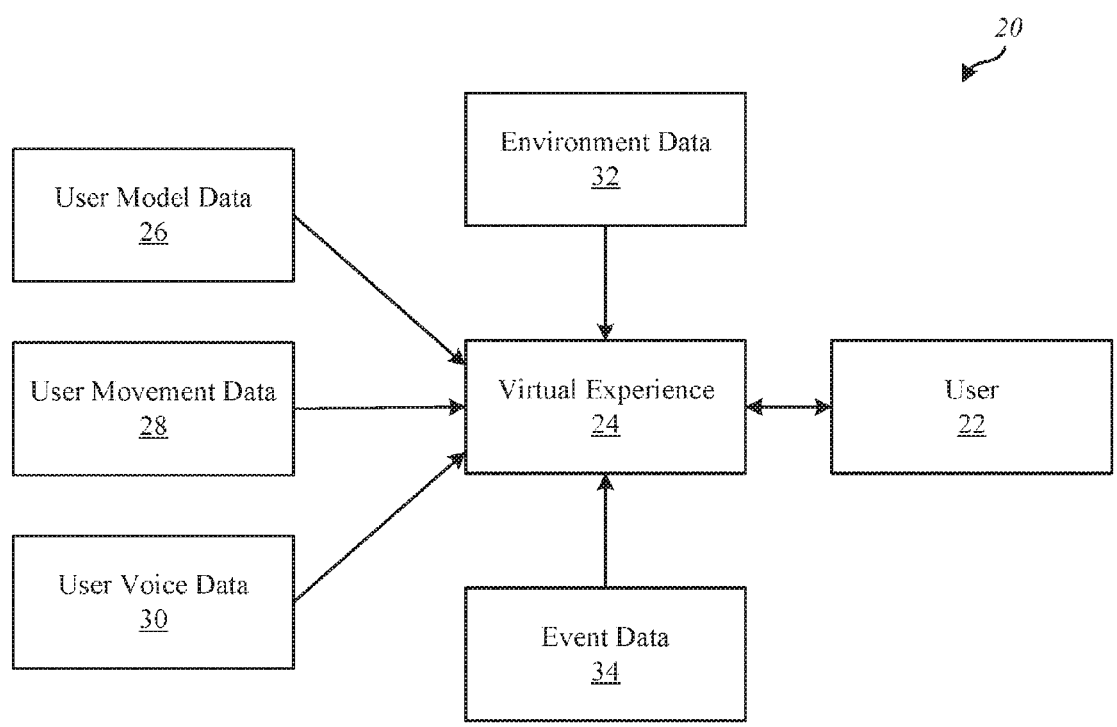
FIG. 1 is an overview block diagram illustrating an example of data flow for a virtual experience process according to principles disclosed herein.

FIG. 1 is an overview block diagram illustrating an example of data flow for a virtual experience process 20 according to principles disclosed herein. In this example, the virtual experience process 20 includes a user 22, a virtual experience 24, user model data 26, user movement data 28, user voice data 30, environment data 32, and event data 34.

The user 22 is presented the virtual experience 24 that the user 22 may participate and interact within. As will be further discussed herein, the user 22 may view the virtual experience 24 by using a headset 52.

The virtual experience 24 is created using one or more of the various data sources 26-34. In some embodiments, the virtual experience process 20 uses the user model data 26, user movement data 28, user voice data 30, environment data 32, and event data 34 to generate the virtual experience 24.

The user model data 26 includes a three-dimensional model of the user 22. The three-dimensional model may include the user's entire body, or portions of the user's body, such as arms, hands, legs, and/or feet. The user model data 26 may include accurate measurements of the user's body dimensions (e.g., body size, head size, foot size, etc.), as well as features of the user's appearance (e.g., haircut, clothes, earrings, glasses, etc.). The three-dimensional model may be generated by scanning the user's body with various three-dimensional scanning techniques known in the art. The user model data 26 allows a virtual three-dimensional version of the user 22 to be recreated in the virtual experience 24.

The user movement data 28 includes styles or patterns of movement of the user 22. The styles or patterns of movement may include a way that the user 22 walks, runs, jumps, dances, laughs, and/or other common movements. The user movement data 28 may be generated by recording the user 22 performing sample movements, and then extrapolating those movements to the a movement model. For example, the user's movements may be extrapolated to a three-dimensional wire-frame model of a human. The user movement data 28 allows a virtual version of the user 22 recreated in the virtual experience 24 to move in a similar way as the user 22.

The user voice data 30 includes a model of the sound of the user's voice. The model of the sound of the user's voice may be generated by recording the user 22 saying sample words and/or phrases. The characteristics of the user's voice may then be modeled using one or more vocal modeling techniques known in the art. The user voice data 30 allows a virtual version of the user 22 recreated in the virtual experience 24 to have a similar voice as the user 22.

The environment data 32 includes a three-dimensional model of a real-world or virtual location. For example, the three-dimensional model may be of a room, stadium, park, museum, street, and/or other environments. The three-dimensional model of the location may be generated by scanning the real-world location with various three-dimensional scanning techniques known in the art. Alternatively or in addition, the real-world or virtual location may be generated by a designer. The environment data 32 allows a virtual three-dimensional version of a location to be recreated in the virtual experience 24

The event data 34 includes a recording of an event. The captured event may occur in the location associated with the environment data 32, or in another location. The event may include the user 22, or another user. In some examples, the other user may be an actor, athlete, politician, or other public figure. The event data 34 may include the movements and points-of-view of the user participating in the event. The event data 34 may also include sounds heard by the user participating in the event, and words spoken by the user participating in the event. The event data 24 allows the event to be recreated for the user 22 as the virtual experience 24.

The virtual experience 24 is a recreation of the captured event contained in the event data 34. The virtual experience 24 may take place in the location of the captured event, or in another location provided by the environment data 32. The virtual experience 24 replaces the user who originally participated in the captured event with a virtual recreation of the user 22. The virtual recreation of the user 22 is generated based on the user model data 26, the user movement data 28, and the user voice data 30. This allows the user 22 to experience the captured event as if they were the user that originally participated in the event.

After doing so, the new event with the user 22 may be captured, recorded, stored, and shared with other users as if the user 22 participated in the original event. For example, the user 22 could experience skydiving by taking the place of a real skydiver who recorded the event. The user 22 could then save and share this virtual experience 24 with their friends. As another example, an actor could record an event on the set of a movie. The user 22 could can then take the place of the actor in that event, and virtually experience what it feels like to be an actor.

In some embodiments, the virtual experience 24 may provide medical analysis of a user 22. For example, the virtual experience 24 may evaluate the user's body structure, motion, and health by analyzing the user model data 26, the user movement data 28, and/or the user voice data 30.

In some embodiments, multiple users may participate in a single virtual experience 24 in real-time. For example, the event may be a sporting event recorded by players. Then two users may place themselves at two different positions on the sports team. As another example, the event may be an educational lesson. Multiple users may then participate in the educational lesson and interact with each other. For example, one user 22 may be inserted into a biology lab environment with two other users that are also inserted into the biology lab environment. However, each of the users may be in physically different locations. In this lab environment, the users can dissect a frog together, for example, and the virtual actions of the users can be evaluated by the virtual experience 24 to determine the results. For example, if a user's virtual actions include slicing off the frog's leg, the frog's leg will appear to fall off in the virtual experience 24. In some examples, the virtual experience 24 may also notify the user if they are doing something wrong in the virtual experience 24.

In some embodiments, another user without specific user model data 26, user movement data 28, or user voice data 30 may also utilize the virtual experience 24. In these embodiments, the user participates in the virtual experience 24 using a generic virtual user model, or with a virtual user model of the person who originally recorded the event.

In some embodiments, the virtual experience 24 may be monetized. For example, users who record events could receive fees from other users who place themselves in the events through the virtual experience 24. In addition, production companies may create virtual experiences 24, and then charger users to place themselves in the experiences.

Figure 2:
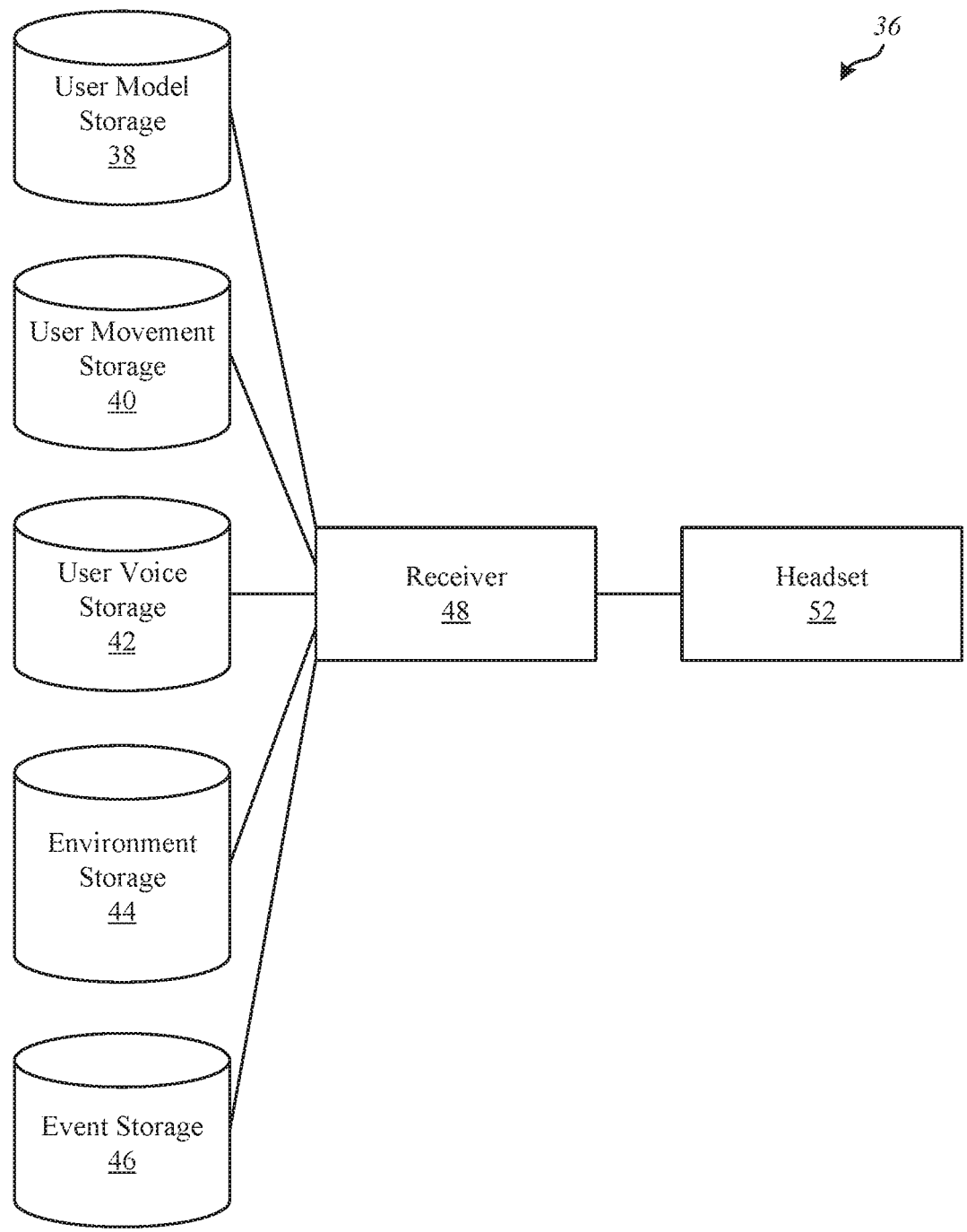
FIG. 2 is a block diagram illustrating an example of a virtual experience system for practicing example embodiments of the virtual experience process according to principles disclosed herein.

FIG. 2 is a block diagram illustrating an example of a virtual experience system 36 for practicing example embodiments of the virtual experience process 20 according to principles disclosed herein. In this example, the virtual experience system 36 includes a user model storage 38, user movement storage 40, user voice storage 42, environment storage 44, event storage 46, a receiver device 48, and a headset 52. The user model data 26, user movement data 28, user voice data 30, environment data 32, and event data 34 described in reference to FIG. 1 are recorded in the user model storage 38, user movement storage 40, user voice storage 42, environment storage 44, and event storage 46, respectively.

The user model storage 38, user movement storage 40, user voice storage 42, environment storage 44, and event storage 46 are coupled to the receiver 48. In some embodiments, the user model storage 38, user movement storage 40, user voice storage 42, environment storage 44, and event storage 46 may be coupled to the receiver 48 through a server or network connection. For example, the user model storage 38, user movement storage 40, user voice storage 42, environment storage 44, and event storage 46 may be part of a cloud computing architecture which the receiver 48 accesses to retrieve data for the virtual experience 24.

The receiver 48 is configured to access the user model storage 38, user movement storage 40, user voice storage 42, environment storage 44, and event storage 46 and to assemble the virtual experience 24 from the user model data 26, user movement data 28, user voice data 30, environment data 32, and/or event data 34. The receiver 48 may access the user model storage 38, user movement storage 40, user voice storage 42, environment storage 44, and/or event storage 46 periodically, upon notification of data being updated, or on-demand.

The receiver 48 may be configured to obtain one or more of the user model data 26, user movement data 28, user voice data 30, environment data 32, and/or event data 34 from a server. Alternatively or in addition, in some embodiments, the receiver 48 may be configured to obtain one or more of the user model data 26, user movement data 28, user voice data 30, environment data 32, and/or event data 34 through a satellite or coaxial cable connection. Upon obtaining the data, the receiver 48 is configured to combine the user model data 26, user movement data 28, user voice data 30, environment data 32, and event data 34 to create the virtual experience 24. The receiver 48 may obtain the data periodically, upon notification of data being updated, or on-demand. In another embodiment, a remote server assembles virtual experience 24, and the receiver 48 obtains the assembled virtual experience 24 from the remote server.

The receiver 48 may be any suitable converter device or electronic equipment that is operable to receive data. The receiver 48 may be interchangeably referred to as a "TV converter," "receiving device" "set-top box," "TV receiving device," "TV receiver," "TV recording device," "satellite set-top box," "satellite receiver," "cable set-top box," "cable receiver," "media player," and/or "TV tuner."

The headset 52 is coupled to the receiver 48. The headset 52 is configured to provide virtual transport of the user 22 into the virtual experience 24 by displaying the virtual experience 24 to the user 22. Through the headset 52, the user 22 is able to participate and interact with the virtual experience 24. By utilizing the user model data 26, it may appear to the user 22 that they are in the event.

In some embodiments, the headset 52 may be replaced by other presentation devices. Examples include a TV, a personal computer ("PC"), a sound system receiver, a digital video recorder ("DVR"), a compact disk ("CD") device, game system, or the like. Presentation devices employ a display, one or more speakers, a microphone, and/or other input/output devices to communicate with the user 22. In many implementations, one or more presentation devices reside in or near the user's 22 premises and are communicatively coupled to the receiver 48. Further, the receiver 48 and a presentation device may be integrated into a single device. Such a single device may have the above-described functionality of the receiver 48 and the headset 52, or may even have additional functionality.

Figure 3:
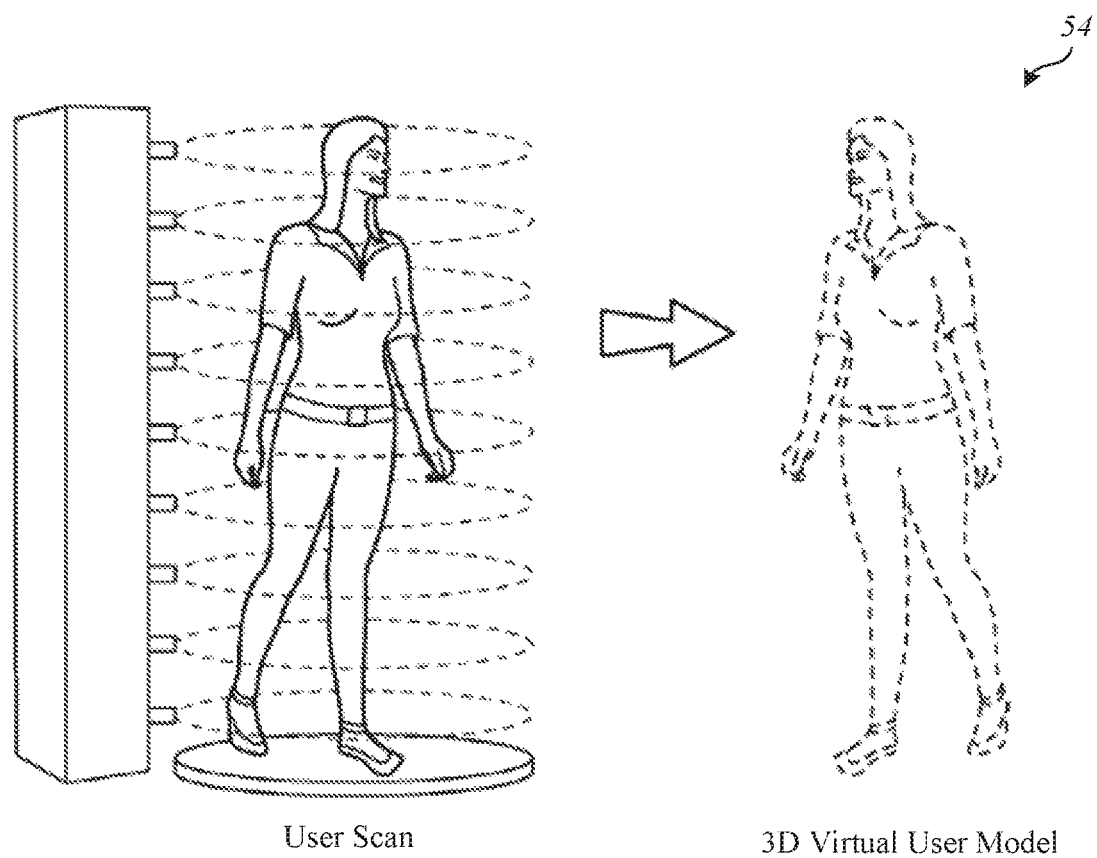
FIG. 3 is a diagram illustrating an example of a user modeling device for practicing example embodiments of the virtual experience process according to principles disclosed herein.

FIG. 3 is a diagram illustrating an example of a user modeling device 54 for practicing example embodiments of the virtual experience process 20 according to principles disclosed herein. As shown in FIG. 3, in one embodiment, a three dimensional virtual user model may be generated by scanning a user. The three dimensional virtual user model may be generated by using a camera and depth sensor that use full-body 3D motion capture technologies to output a depth and color stream. The depth and color stream may then be included in the user model data 26 described in reference to FIG. 1.

In some embodiments, the user modeling device 54 may also capture user movement data 30. The user modeling device 54 may request the user 22 to make particular motions or gestures, then the camera and depth sensors may record the motions and gestures to generate the user movement data 30.

The user modeling device 54 may also include one or more microphones for capturing user voice data 28. The user modeling device 54 may request the user 22 to speak certain words or phrases, and then record the words and phrases with the microphones to generate the user voice data 28.

Figure 4:
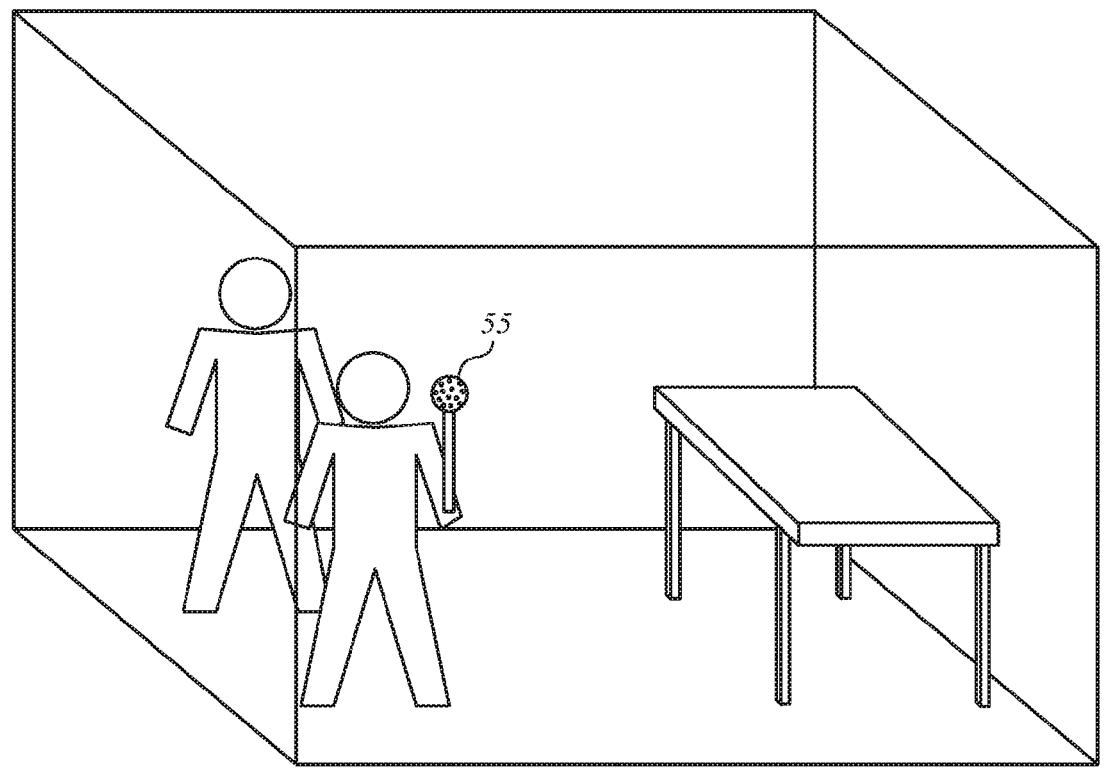
FIG. 4 is a diagram illustrating an example of an event capture device for practicing example embodiments of the virtual experience process according to principles disclosed herein.
Figure 4:
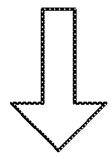
Figure 4:
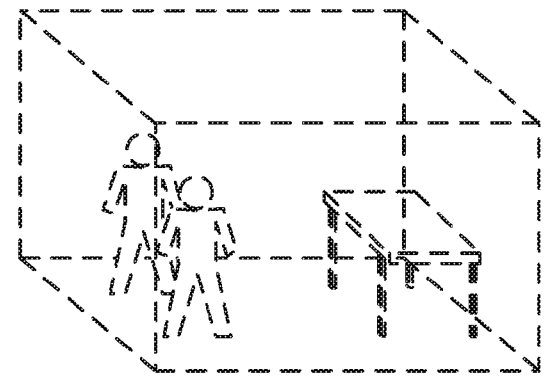

FIG. 4 is a diagram illustrating an example of an event capture device 55 for practicing example embodiments of the virtual experience process 20 according to principles disclosed herein. As shown in FIG. 4, in one embodiment, a three dimensional virtual recreation of the event may be generated by capturing an environment with the event capture device 55. The event capture device 55 may include standard video recording technology as well as the depth sensor technology to create a three-dimensional version of the event. The event capture device 55 may capture the environment, people, objects, and sounds of an event simultaneously. In some embodiments, the event capture device 55 may capture the event as multiple layers. For example, one layer may include the background environment, and another layer may include each of the people or objects in the environment. The different layers may allow for replacement of individual people and/or objects later when the virtual experience is generated.

The data from the event capture device 55 may then be included in the environment data 32 and/or event data 34 described in reference to FIG. 1. In some embodiments, a user may tag the event with keywords that describe the event and/or the user's experience. The keywords may then be used for organizing and locating specific events or experiences in the system.

Figure 5:
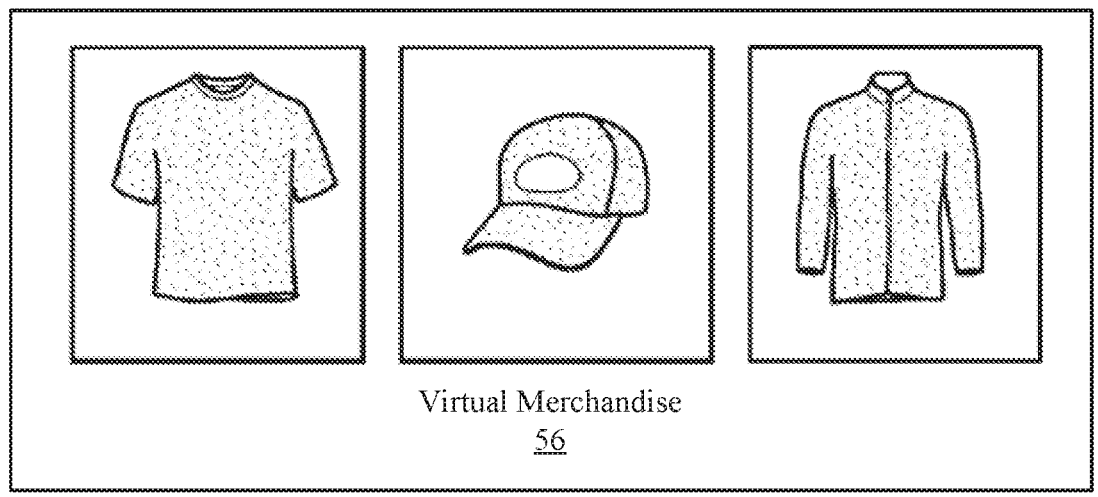
FIG. 5 is a block diagram illustrating an example of virtual merchandise for the virtual experience according to principles disclosed herein.

FIG. 5 is a block diagram illustrating an example of virtual merchandise 56 for the virtual experience 24 according to principles disclosed herein. The virtual merchandise 56 is used to allow the user 22 to wear different clothes within the virtual experience 24. In some examples, the user 22 may purchase or rent the virtual merchandise 56 for use in the virtual experience 24. In other examples, the user 22 may try on the virtual merchandise 56 to see if the virtual merchandise fits correctly and looks good on the three-dimensional model of the user 22 in the virtual experience 24. In some embodiments, sampling different merchandise may be part of the virtual experience 24 itself. For example, an actor could record themselves trying on various clothes, then the user 22 could place themselves in that event and try on the exact same clothes in the same manner that the actor did. As another example, the captured event may be a wedding. The user 22 may attend the wedding as a virtual experience 24 and rent a tuxedo for their virtual three-dimensional user model to wear at the wedding.

In some examples, merchandise that was in a captured event may be replaced with other merchandise in the virtual experience 24. For example, a user may capture a party event where a guest is wearing an embarrassing shirt. In the virtual experience 24 of that party, the embarrassing shirt may be replaced with another shirt. This may allow the event to be shared as a virtual experience 24 without embarrassing the guest wearing the embarrassing shirt.

In some examples, virtual merchandise 56 may be purchased or rented for another user. For example, a husband may rent a pair of jeans for his wife and see if they fit on a three-dimensional representation of her in the virtual experience 24 before purchasing them in real-life.

Figure 6:
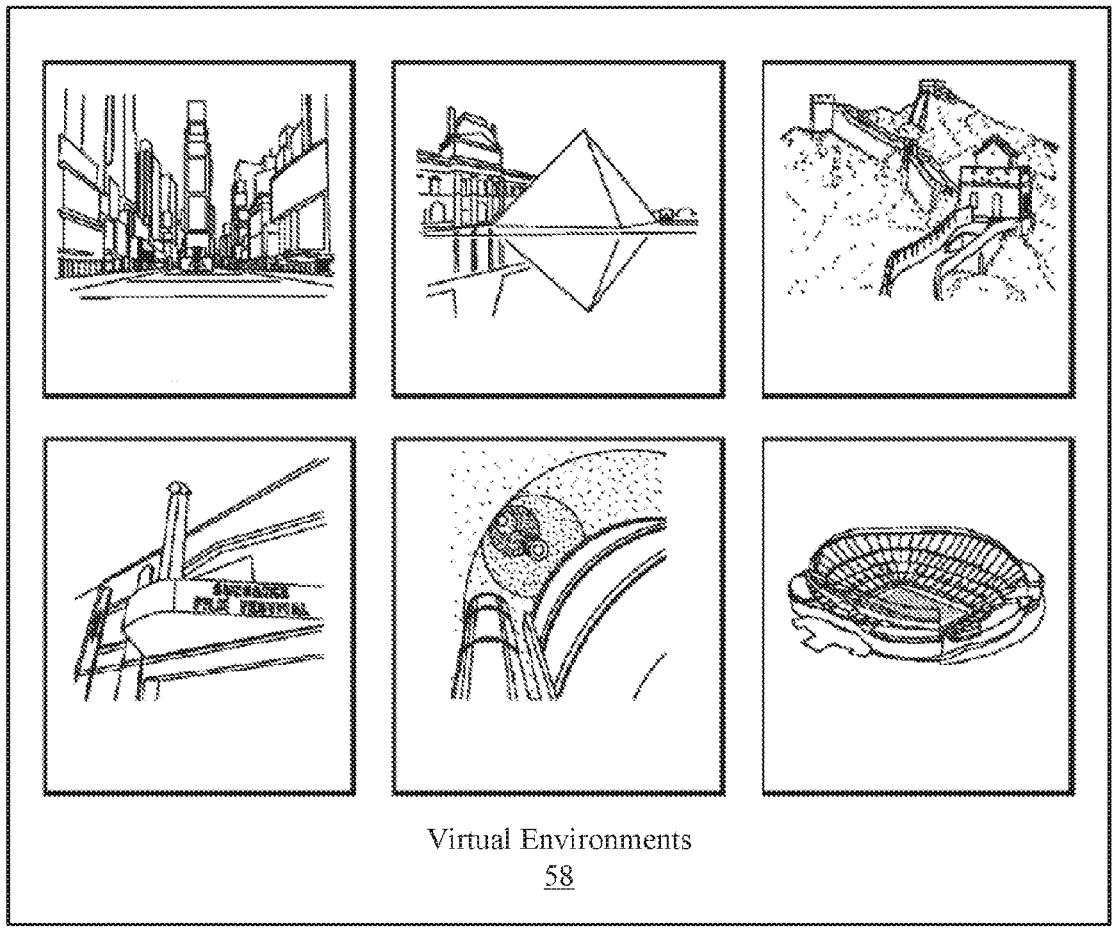
FIG. 6 is a block diagram illustrating an example of virtual environments for the virtual experience according to principles disclosed herein.

FIG. 6 is a block diagram illustrating an example of virtual environments 58 for the virtual experience 24 according to principles disclosed herein. The virtual environments 58 may be examples of the environment data 32 described in reference to FIG. 1. As shown in FIG. 5, the virtual environments 58 may include specific locations such as Times Square in New York City, the Louvre in Paris, and the Great Wall of China, or more general locations such as a theater, a science museum or a football stadium. The user 22 may visit different virtual environments 58 as part of the virtual experience 24.

In some embodiments, the user 22 may mix and match different virtual environments 58 with different events and user models. For example, by substituting a captured event into another virtual environment 58, the user 22 may create their own unique virtual experience 24. In addition, the user 22 may include different virtual merchandise 56 in the virtual experience 24 to further customize the experience.

Figure 7:
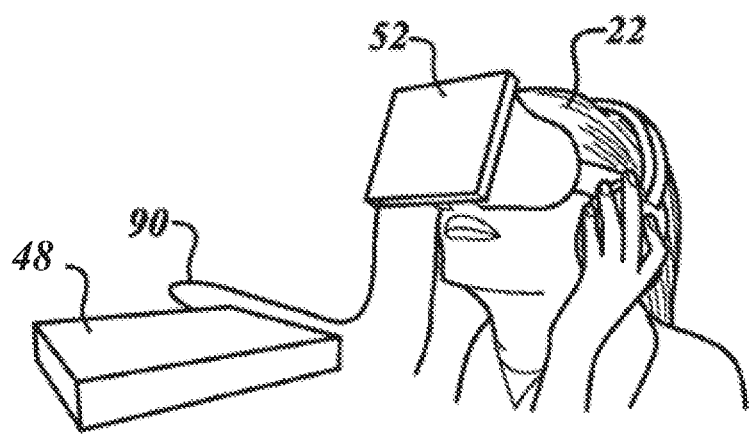
FIG. 7 is a schematic illustrating an example of the user connected to the virtual experience system according to principles disclosed herein.

FIG. 7 is a schematic illustrating an example of the user 22 connected to the virtual experience system 36 according to principles disclosed herein. In this example, the user 22 is wearing the headset 52 that is connected to the receiver 48 through a wire connection 90. The headset 52 is configured to display the virtual experience 24 to the user 22, and allow the user 22 to participate and interact within the virtual experience 24. It should be noted that, although FIG. 6 shows that the headset 52 is hardwired to the receiver 48, the virtual headset 52 may be coupled to the receiver 48 wirelessly.

Although specific embodiments were described herein, the scope of the invention is not limited to those specific embodiments. The scope of the invention is defined by the following claims and any equivalents therein.

What is claimed is:

1. A virtual experience system, comprising:
   a user model storage configured to store user model data corresponding to a three-dimensional representation of a user;
   a user movement storage configured to store user movement data corresponding to at least one movement characteristic of the user;
   a user voice storage configured to store user voice data corresponding to at least one vocal characteristic of the user;
   an environment storage configured to store environment data corresponding to a three-dimensional representation of a location;
   an event storage configured to store event data corresponding to a captured event at the location;
   a receiver configured to assemble a virtual experience based at least in part on the user model data, the user movement data, the user voice data, the environment data, and the event data, wherein the receiver is configured to assemble the virtual experience such that the three-dimensional representation of the user, the vocal characteristic of the user, and the movement characteristic of the user replace a person who was physically present at the captured event; and
   a display device coupled to the receiver, the display device configured to display the virtual experience to a user, the user being able to virtually experience the captured event at the location, with the three-dimensional representation of the user, the vocal characteristic of the user, and the movement characteristic of the user inserted into the captured event.

2. The system according to claim 1, further comprising:
   a user modeling device configured to capture the user model data, the user voice data, the user movement data, or a combination thereof.

3. The system according to claim 1, further comprising:
   an event capture device configured to capture the event data, the environment data, or a combination thereof.

4. The system according to claim 1, wherein the virtual experience includes virtual merchandise inserted into the virtual experience.

5. The system according to claim 4, wherein the user purchases the virtual merchandise.

6. The system according to claim 4, wherein the virtual merchandise replaces physical merchandise present at the captured event.

7. The system according to claim 1, wherein the captured event is associated with a real-life event captured at a physical location.

8. The system according to claim 1, wherein the virtual experience with the three-dimensional representation of the user, the vocal characteristic of the user, and the movement characteristic of the user inserted into the captured event is stored as a new captured event.

9. The system according to claim 1, wherein the receiver is further configured to assemble the virtual experience based at least in part on second user model data, second user movement data, and second user voice data, such that multiple users are inserted into the captured event.

10. A method, comprising:
    receiving user model data corresponding to a three-dimensional representation of a user;
    receiving user movement data corresponding to at least one movement characteristic of the user;
    receiving user voice data corresponding to at least one vocal characteristic of the user;
    receiving environment data corresponding to a three-dimensional representation of a location;
    receiving event data corresponding to a captured event at the location;
    assembling a virtual experience based at least in part on the user model data, the user movement data, the user voice data, the environment data, and the event data, wherein the assembling includes replacing a person who was physically present at the captured event with the three-dimensional representation of the user, the vocal characteristic of the user, and the movement characteristic of the user; and
    displaying the virtual experience to a user, the user being able to virtually experience the captured event at the location, with the three-dimensional representation of the user, the vocal characteristic of the user, and the movement characteristic of the user inserted into the captured event.

11. The method according to claim 10, further comprising:
    capturing the user model data, the user voice data, the user movement data, or a combination thereof with a user modeling device.

12. The method according to claim 10, further comprising:
    capturing the event data, the environment data, or a combination thereof with an event capture device.

13. The method according to claim 10, further comprising:
    inserting virtual merchandise into the virtual experience.

14. The method according to claim 13, wherein the user purchases the virtual merchandise.

15. The method according to claim 13, wherein the virtual merchandise replaces physical merchandise present at the captured event.

16. The method according to claim 10, wherein the captured event is associated with a real-life event captured at a physical location.

17. The method according to claim 10, further comprising:
    storing the virtual experience with the three-dimensional representation of the user, the vocal characteristic of the user, and the movement characteristic of the user inserted into the captured event is stored as a new event.

18. The method according to claim 10, wherein the virtual experience is assembled based at least in part on second user model data, second user movement data, and second user voice data, such that multiple users are inserted into the captured event.

* * * * *